United States Patent [19]

Plourde

[11] Patent Number: 5,601,927
[45] Date of Patent: Feb. 11, 1997

[54] CLING SIGNAGE

[75] Inventor: Roger P. Plourde, Paxton, Mass.

[73] Assignee: Furon Company, Laguna Niguel, Calif.

[21] Appl. No.: 349,628

[22] Filed: Dec. 5, 1994

[51] Int. Cl.$^6$ .................... B32B 27/00; B32B 7/12
[52] U.S. Cl. .................. 428/448; 428/483; 428/480; 428/451; 428/354
[58] Field of Search .................... 428/480, 483, 428/448, 451, 354

[56] References Cited

U.S. PATENT DOCUMENTS 5,370,930 12/1994 Ito ........................... 428/480 X
5,391,429 2/1995 Otani et al. ................. 428/480 X
5,462,788 10/1995 Ohashi et al. ............... 428/451 X

*Primary Examiner*—Daniel Zirker
*Attorney, Agent, or Firm*—Samuels, Gauthier, Stevens & Reppert

[57] ABSTRACT

A multilayered cling signage sheet for use in conventional printers, including laser printers. The sheet includes a first layer to provide structural integrity to the sheet. A second print receptive layer is adhered to one side of the first layer. A third layer which is a low modulus cling elastomer is adhered to the other side of the first layer. The cling elastomer is characterized in that it will releasably adhere to a substantially flat surface.

27 Claims, 1 Drawing Sheet

CLING SIGNAGE

FIELD OF THE INVENTION

The invention relates to cling signage, specifically, a flexible sheet which can be used in conventional computer printers, copy machines and any other industrial printing technique for printing on the sheet and which sheet, when in use, repeatedly releasably engages a flat surface.

BACKGROUND OF THE INVENTION

Standard cling signage comprises releasable flexible plastic films having visual indicia printed on one side thereof. The plastic film is typically a highly plasticized polyvinyl chloride approximately 0.016" thick. This film requires the use of a heavy gauge release paper to support it during the printing process. When the film is placed against a flat surface, usually glass, it clings to the surface. The film is easily released from the surface and can be re-adhered to a surface several times. The present drawbacks with cling signage are that it is difficult to print on the highly plasticized PVC film, the cost is relatively high, it is relatively bulky, and it is difficult to apply at cold temperatures. Perhaps the most significant drawbacks are the cost and difficulty of printing on the highly plasticized surface. Furthermore, the films cannot be used in existing printing machines and/or copy machines.

The present invention embodies a laminated sheet for cling signage. The sheet overcomes all of the limitations of cling PVC signage and particularly, the sheet of the invention is processable on all copy machines, computer printers, pen plotters, offset and litho presses and screen printers. The sheet of the invention is relatively thin, 0.00048" to 0.00100", compared to prior art cling signage, 0.016". This thinness allows the sheet to be used in all types of computer printers and copy machines.

The sheet as a minimum comprises a support film, i.e. a polyester film, a print receptive coating on one side of the film and an adhesive coating on the other side of the film. The print receptive coating is selected based on its ability to adhere to the film and its receptiveness to have an image formed thereon. That is, depending upon whether the sheet of the invention is to be used with a laser printer, color ink jet printer, lithopress, etc., the print coating will be selected based on the intended printing process.

The adhesive coating is referred to herein as a cling elastomeric coating. As will be described, it distinguishes from those coatings commonly referred to as pressure sensitive adhesive coatings in that it does not loose its effective adhesive characteristics over a series of repeated applications as do most pressure sensitive adhesive coatings.

Broadly, the sheet comprises a plurality of layers including a top layer which is a print receptive coating. The print receptive top layer can be customized to work with all types of commercially available ink and imaging systems.

The print receptive coating will vary in composition depending on the print market in which it will be used. Styrene/acrylic polymers with silica fillers are known to work in thermal transfer printing. Polyester or acrylic polymers with silica fillers are known to work in copy machines, laser printers, dot matrix, offset, litho and screen printing applications. Polyvinyl pyrrolindones and ethyl celluloses are known to work in ink jet applications. Print receptive coatings have been developed for polyethylene terphalate and other orientated films that work in all the different types of printing equipment. Although attempts have been made, as a practical matter, nothing can be done to make the polyvinyl chloride cling signage processable on copy machines and computer printers.

The next adjacent layer is an oriented film to provide structural integrity to the sheet when used as signage. This layer is an oriented film that will vary in thickness and type dependent on the application and market. Both clear and opaque white polyethylene terphalate and biaxially oriented polypropylene in thicknesses ranging from 0.00048" to 0.00100" can be used depending on the end use market.

The next adjacent layer is a coating of a cling elastomer. The cling elastomer used in the preferred embodiment of the invention has a Tg of −65° C. which allows a functional temperature range of −65° C. to 160° C. compared to the 0° C. to 80° C. range of the prior art polyvinylchloride. The cling elastomer used is not a pressure sensitive adhesive and can be cleaned and reused indefinitely. Pressure sensitive adhesives, once contaminated, no longer adhere.

The cling elastomeric coating will vary in thickness and polymer type dependent on application and end market. The elastomers of choice are either silicone or polyurethane based. Platinum catalyzed addition cured silicone polymers are preferred because of their processing advantages. Diphenylmethane diisocyanate or toluene diisocyanate cured urethanes are also preferred because of their low modulus and processing advantages.

The next layer is a film to protect the elastomer and to provide dimensional stability to the sheet. The layer preferably is an oriented film or polycoated paper that will vary in thickness and type dependent on the market. This layer's function will be to protect the elastomer from contamination and to provide physical support to the construction during the printing process.

The next and last layer is a friction coating such as polyester filled with silica to facilitate the use of the sheet in conventional printing and copying machines.

The print receptive layer, elastomers and friction layer are applied in roll to roll processes that include but are not limited to the following types of coating methods: meyer rod, gravure, offset gravure, reverse roll, knife over roll and slot die. The proper combinations of the layer thicknesses can be used to allow processability on all copy machines and computer printers.

DESCRIPTION OF THE PREFERRED EMBODIMENT(S)

The following illustrative example of an embodiment of the invention is solely for purposes of illustration and not limitation.

Figure 1:
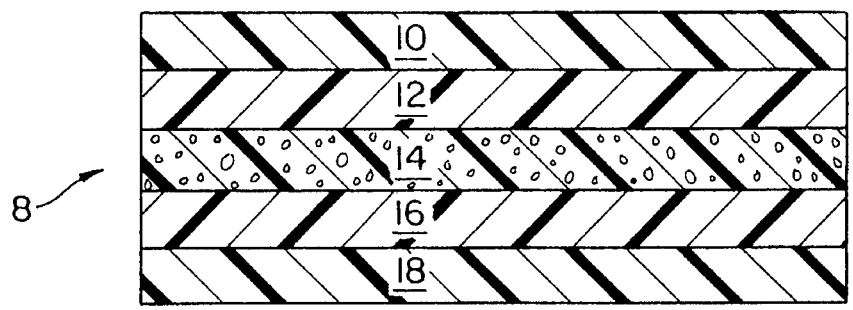
FIG. 1 is a schematic illustration of a sheet embodying the invention.

Referring to FIG. 1, a sheet 8 embodying the invention comprises a first layer 10 which is a print coating; a second layer 12 which is a flexible film such as a biaxially oriented polyester film; a third layer 14 which is a cling elastomeric coating; a layer 16 which is a protective film and a layer 18 which is a coating to impart a frictional surface to the film 16 to facilitate the use of the sheet in a printing process.

3

The example of the invention will be described in reference to the preparation of cling signage which is suitable for use in the standard state-of-the-art laser printers.

Figure 2:
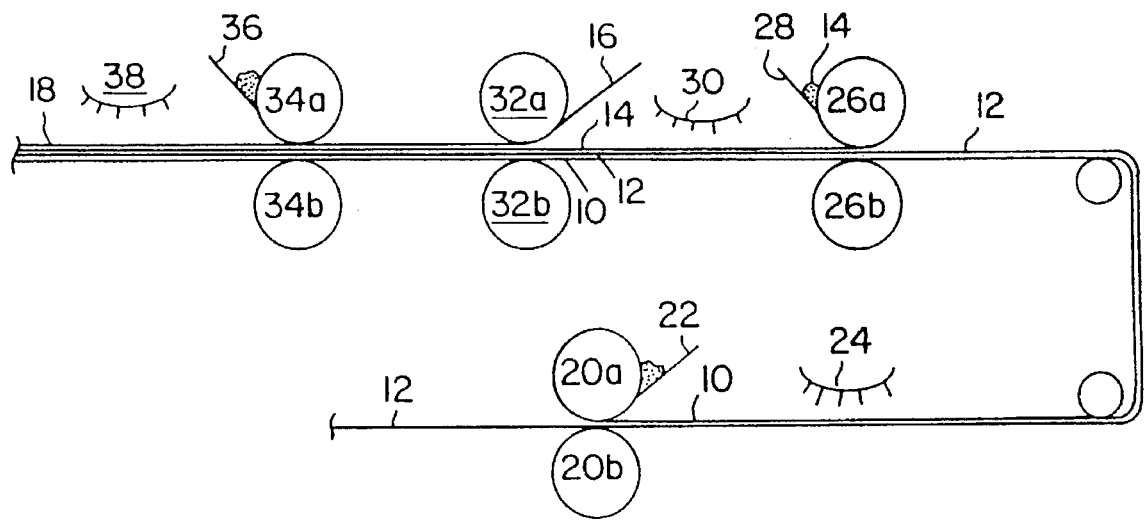
FIG. 2 is a flow diagram of a process embodying the invention.

Referring to FIG. 2, the film 12 of PET having a thickness of between 0.00092" to 0.00495" passes between rollers 20a and 20b where a knife 22 applies a print coating 10, having a print receptive surface, to the roller 20a. The coating is then transferred to the film 12. Specifically the coating is polymethacrylate filled with silica in an amount of 20% by weight based on the total weight of the coating and is applied in a thickness of between 0.00010" to 0.0010". The coating is dried and cured by passing under a heater 24 at a temperature between 190° to 260° F.

The film 12 with the print coating 10 has its orientation reversed and passes through rollers 26a and 26b where the cling elastomeric coating 14, e.g. silicone, specifically a platinum catalyzed addition cured silicone is cast on the roll 26a by a knife 28 in a thickness of between 0.0002" to 0.0020". This coating is transferred to the film 12. The coating is then dried and cured by passing it under a heater 30 at a temperature of between 180° to 300° F.

The protective film 16, e.g. PET, in a thickness of between 0.00092" to 0.00492" contacts the coating 14 which then passes through nip rollers 32a and 32b at a nip pressure of 2#/in to adhere the film 16 to the coating 14.

This laminate 10, 12, 14 and 16 then passes through rollers 34a and 34b where a knife 36 applies the friction coating 18, e.g. a silica filled polyester, specifically a 30% by weight loading of silica, in a thickness of 0.0002" to 0.0020" to the roller 34a to form the sheet 8. The coating 18 passes under a heater 38 and dried at a temperature between 160° to 250° F.

The fully formed sheet is then either rolled and stored for further use or cut to size and packaged.

For this example, typically the sheet 8 would be cut to 8 ½" by 11" size for use in a laser printer. In a laser printer the sheets to be used for printing are simply stacked and placed in the printer tray as with ordinary bond paper. Depending upon the visual indicia desired, it is simply printed on the surface 10 via the computer instruction.

When ready for use as cling signage, the protective film 16 together with the associated coating 18 are peeled from the coating 14 and the coated surface 14 adheres to a flat surface, particularly a flat glass surface.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A multilayered cling signage sheet which comprises:

a first layer to provide structural integrity to the sheet;

a second print receptive layer adhered to one side of the first layer; and a third low modulus cling elastomer layer having a thickness of between 0.0002 to 0.0020 adhered to the other side of the first layer, the cling elastomer characterized in that it will releasably and repeatedly adhere to a substantially flat surface.

2. The sheet of claim 1 which comprises:

a fourth protective layer adhered to the cling elastomer layer.

3. The sheet of claims 1 or 2 which comprises: a fifth friction enhancing layer engaged to the fourth layer.

4. The sheet of claim 3 wherein the fourth layer is interposed between the third and fifth layer.

5. The sheet of claim 4 which has a thickness in a range of between 0.00048" to 0.00100".

6. The sheet of claim 4 characterized in that it will adhere to the flat surface in a temperature range of between −65° C. to 160° C.

7. The sheet of claim 4 wherein the second print receptive layer is a coating, said coating selected from the group consisting of styrene, acrylic, polyester, and polyvinyl pyrrolindone polymers and ethyl cellulose.

8. The sheet of claim 4 wherein the first layer is a film selected from the group consisting of polyethylene terephthalate and biaxially oriented polypropylene films.

9. The sheet of claim 4 wherein the third layer is a silicone based polymer.

10. The sheet of claim 4 wherein the third layer is a platinum catalyzed addition cured silicone polymer.

11. The sheet of claim 4 wherein the fourth layer is an oriented film selected from the group consisting of polyethylene, polyethylene terephthalate and polypropylene.

12. The sheet of claim 11 wherein the fourth layer is a polycoated paper.

13. The sheet of claim 4 wherein the fifth layer is selected from the group consisting of polyester, acrylic, polyurethane and styrene butadiene.

14. A multilayered cling signage sheet which comprises:

a first layer to provide structural integrity to the sheet;

a second print receptive layer adhered to one side of the first layer;

a third low modulus cling elastomer layer adhered to the other side of the first layer, the cling elastomer characterized in that it will releasably adhere to a substantially flat surface;

a fourth protective layer adhered to the cling elastomer layer; and a fifth friction enhancing layer engaged to the fourth layer.

15. The sheet of claim 14 which has a thickness in a range of between 0.00048" to 0.00100".

16. The sheet of claim 14 characterized in that it will adhere to the flat surface in a temperature range of between −65° C. to 160° C.

17. The sheet of claim 14 wherein the second print receptive layer is a coating, said coating selected from the group consisting of styrene, acrylic, polyester, and polyvinyl pyrrolindone polymers and ethyl cellulose.

18. The sheet of claim 14 wherein the first layer is a film selected from the group consisting of polyethylene terephthalate and biaxially oriented polypropylene films.

19. The sheet of claim 14 wherein the third layer is a silicone based polymer.

20. The sheet of claim 14 wherein the fourth layer is a polycoated paper.

21. The sheet of claim 14 wherein the fifth layer is selected from the group consisting of polyester, acrylic, polyurethane and styrene butadiene.

22. A multilayered cling signage sheet which comprises:

a first layer to provide structural integrity to the sheet;

a second print receptive layer adhered to one side of the first layer;

a third low modulus cling elastomer layer comprising a platinum catalyzed addition cured silicone polymer adhered to the other side of the first layer, the cling elastomer characterized in that it will releasably adhere to a substantially flat surface;

a fourth protective layer adhered to the cling elastomer layer; and a fifth friction enhancing layer engaged to the fourth layer and wherein the fourth layer is interposed between the third and fifth layers.

23. The sheet of claim 22 wherein the fourth layer is a polycoated paper.

24. The sheet of claim 22 wherein the fifth layer is selected from the group consisting of polyester, acrylic, polyurethane and styrene butadiene.

25. A multilayered cling signage sheet which comprises:

a first layer to provide structural integrity to the sheet;

a second print receptive layer adhered to one side of the first layer;

a third low modulus cling elastomer layer adhered to the other side of the first layer, the cling elastomer characterized in that it will releasably adhere to a substantially flat surface;

a fourth protective layer adhered to the cling elastomer layer; and a fifth friction enhancing layer engaged to the fourth layer and wherein the fourth layer is interposed between the third and fifth layer and the fourth layer is an oriented film selected from the group consisting of polyethylene, polyethylene terephthalate and polypropylene.

26. The sheet of claim 25 wherein the fourth layer is a polycoated paper.

27. The sheet of claim 25 wherein the fifth layer is selected from the group consisting of polyester, acrylic, polyurethane and styrene butadiene.

* * * * *